United States Patent [19]

Hedrick et al.

[11] Patent Number: 5,776,990
[45] Date of Patent: Jul. 7, 1998

[54] FOAMED POLYMER FOR USE AS DIELECTRIC MATERIAL

[75] Inventors: James Lupton Hedrick, Oakland; Donald Clifford Hofer, San Martin; Jeffrey William Labadie, Sunnyvale; Robert Bruce Prime, San Jose; Thomas Paul Russell, San Jose, all of Calif.

[73] Assignee: International Business Machines Corporation, Armonk, N.Y.

[21] Appl. No.: 31,046

[22] Filed: Mar. 11, 1993

Related U.S. Application Data

[63] Continuation of Ser. No. 759,022, Sep. 13, 1991.

[51] Int. Cl.$^6$ ............................................. C08J 9/02
[52] U.S. Cl. ......................... 521/77; 521/134; 521/184; 521/189
[58] Field of Search .................. 521/77, 134, 184, 521/189

[56] References Cited

U.S. PATENT DOCUMENTS

| | | | |
|---|---|---|---|
| 2,915,483 | 12/1959 | Barnhart | 521/77 |
| 3,054,761 | 9/1962 | Moore et al. | 521/77 |
| 3,213,043 | 10/1965 | Kehr | 521/77 |
| 3,224,983 | 12/1965 | D'Alelio | 521/182 |
| 3,547,839 | 12/1970 | Tocker | 521/77 |
| 3,883,452 | 5/1975 | Scheuerlein et al. | 521/77 |
| 3,917,761 | 11/1975 | Scheuerlein et al. | 521/919 |
| 4,159,251 | 6/1979 | Wrasidlo et al. | 210/321 |
| 4,661,526 | 4/1987 | Ford | 521/53 |
| 4,732,586 | 3/1988 | Dick et al. | 55/158 |
| 4,940,733 | 7/1990 | Kuphal et al. | 521/77 |
| 4,980,389 | 12/1990 | Hill et al. | 521/185 |

OTHER PUBLICATIONS

Patel et al., "Microporosity in Thin Polymer Films", presented at 34th International SAMPE Symposium, May 8–11, 1989 in Reno, Nevada.

Patel et al., "The Cure of Epoxy and Poly(propylene Oxide) Modified Epoxy Systems via Dynamic Mechanical Analysis and Thermogravimetric Analysis", presented at the Proced. 18th N. Amer. Thermal Analysis Conf., 1989, 231–239.

Jackson et al., "The Linear Elastic Properties of Microcellular Foams", Polymer, 1991 vol. 32, No. 2.

*Primary Examiner*—Morton Foelak
*Attorney, Agent, or Firm*—Robert B. Martin

[57] ABSTRACT

The present invention relates to an insulating foamed polymer having a pore size less than about 1000 Å made from a copolymer comprising a matrix polymer and a thermally decomposable polymer by heating the copolymer above the decomposition temperature of the decomposable polymer.

5 Claims, No Drawings

5,776,990

FOAMED POLYMER FOR USE AS DIELECTRIC MATERIAL

This is a continuation of copending application Ser. No. 07/759,022 filed on Sep. 13, 1991.

FIELD OF THE INVENTION

The present invention relates to a foamed polymer having a pore size less than about 1000 Å suitable as a dielectric insulator for use in electronic components.

BACKGROUND OF THE INVENTION

There is a continuing desire in the computer industry to increase the circuit density in computer electronic components e.g. multichip modules, chips and the like without degrading electrical performance (e.g. crosstalk) and also to increase the speed of signal propagation in these components. One method of accomplishing these goals is to reduce the dielectric constant of the polymeric insulator used in the components. A method for reducing the dielectric constant of a polymeric insulator such as polyimide is to foam the polymer with air filled pores.

Scheuerlein et al., U.S. Pat. No. 3,883,452, issued May 13, 1975 discloses forming foamed polyimide having average pore size of about 20 microns for use as sleeve bearings. However, in order for a foamed polymer such as polyimide to be an effective insulator, the polymer should have a constant dielectric value averaged over submicron distances. In order to achieve a constant dielectric value, the pore size should be substantially smaller than the feature sizes on the electronic component e.g. chip features which are generally about 5,000 to 200,000 Å (0.5–20 microns). Therefore there is a continuing need in the computer industry for a foamed dielectric polymer having small pore size along with good thermal and mechanical properties to withstand conventional microelectronic component fabrication processing.

It is therefore an object of the present invention to provide a foamed dielectric polymer having small pore size for use in electronic components.

Other objects and advantages will become apparent from the following disclosure.

SUMMARY OF THE INVENTION

The present invention relates to a foamed polymer having an average pore size less than about 1000 Å made by the steps of:

(a) forming a copolymer of a matrix polymer and a thermally decomposable polymer which thermally decomposes at a temperature below the decomposition temperature of the matrix polymer;

(b) heating said copolymer to a temperature which is at or above the decomposition temperature of the thermally decomposable polymer and below the decomposition temperature of the matrix polymer to form said foamed polymer.

Preferably the copolymer is a block copolymer which microphase separates. The block copolymer is preferably formed by reacting a plurality of monomers to form the matrix polymer which couples with an oligomer which constitutes the thermally decomposable polymer.

Preferably the foamed polymer has closed cells preferably with an average pore size less than about 400 Å and more preferably less than about 100 Å. Preferably, the foamed polymer has a glass transition temperature (Tg) of greater than about 200° C. and more preferably greater than about 300° C. Preferred foamed polymers are foamed polyimides and foamed poly (phenylquinoxalines). The present invention also relates to the process for making the foamed polymers of the present invention.

A more thorough disclosure of the present invention is presented in the detailed description which follows.

DETAILED DESCRIPTION OF THE INVENTION

The present invention relates to a foamed polymer having a pore size less than about 1000 Å made by the steps of:

(a) forming a copolymer comprising a matrix polymer and a thermally decomposable polymer which thermally decomposes at a temperature below the decomposition temperature of the matrix polymer;

(b) heating said copolymer to a temperature which is at or above the decomposition temperature of the thermally decomposable polymer and below the decomposition temperature of the matrix polymer to form said foamed polymer.

The copolymer which is formed in the process of making the foamed polymer of the present invention is preferably a block copolymer preferably of the ABA type where A represents the thermally decomposable polymer. Preferably, the block copolymer is formed by reacting one or more monomers to form the matrix polymer which couples with one or more oligomers which constitute the thermally decomposable portion of the copolymer. The matrix polymer may also be preformed before coupling with the thermally decomposable oligomer. The thermally decomposable polymer may also be formed from one or more monomers. It will be known to those skilled in the art that various other types of block copolymers or graft copolymers can also be utilized in forming the polymers of the present invention.

Oligomers used in forming the copolymer have a molecular weight (Mn) which is large enough to enable the oligomer to be formed into a film generally from about 1000 to 20,000 preferably 2500 to 10,000. The oligomer is preferably soluble in organic film forming solvents. Suitable oligomers for forming the thermally decomposable polymer include poly(propylene oxide), poly(methyl methacrylate), and aliphatic polycarbonates e.g. poly(propylene carbonate) and poly(ethylene carbonate). Other suitable oligomers for forming the copolymer will be known to those skilled in the art. In the preferred embodiment of the present invention the oligomer has only one reactive site to enable the formation of the block ABA copolymer.

The thermally decomposable polymer is preferably formed from oligomers and preferably has a decomposition temperature of greater than about 150° C., and preferably, greater than about 200° C. The thermally decomposable polymer preferably decomposes to a nontoxic gas at its decomposition temperature.

The matrix polymer is preferably formed from one or more monomers. The monomer(s) used in forming the matrix polymer should form a polymer which has good mechanical properties and is thermally stable at the decomposition temperature of the thermally decomposable polymer. The decomposition temperature of the matrix polymer is generally at least 25 to 50° C. higher than the decomposition temperature of the thermally decomposable polymer. The matrix polymer preferably has a glass transition temperature (Tg) greater than the decomposition temperature of the decomposable polymer and preferably greater than about 200° C., and more preferably greater than about 300° C. The matrix polymer preferably has a low dielectric constant and good mechanical properties such as high tensile modulus and a high elongation-at-break. Suitable matrix polymers include polyimides, poly(phenylguinoxalines), poly (benzoxazoles), poly(benzimidazoles), poly(triazoles), poly (oxadiazoles) and poly(benzothiazoles). Polyimides can be formed from dianhydride and diamine monomers and poly (phenylquinoxalines) can be formed from tetraamine and phenyl bis (glyoxyloyl) monomers. Suitable monomers for polyimide include: diamines-p,p'oxydianiline, 1,4-phenylenediamine, bis trifluoromethyl benzidine, and 4,4'-(hexafluoroisopropylidine) dianiline; dianhydride/diester-pyromellitate, diethylpyromellitate, di(ethylglycolyl) pyromellitate, oxy-bis (trifluoroethyl phthalate), diethylbi-phenyl tetracarboxylate, 1,1-bis(3,4 dicarboxyphenyl)-1-phenyl-2,2,2-trifluoroethane dianhydride. Suitable monomers for poly (phenylquinoxaline) include 1,3- and 1,4-(phenylgloxalyl)-benzene, 4,4'-(phenylglyoxalyl) diphenyl ether, diaminobenzidine, tetraaminodiphenyl ether, and tetraaminobenzophenone.

The first step in forming the foamed polymer of the present invention involves forming the intermediate copolymer comprising a matrix polymer and a thermally decomposable polymer. The copolymer is preferably a block copolymer which is formed from monomers or oligomers using standard polymer synthetic techniques. Perferably, the block copolymer is formed by reacting in a reaction vessel one or more monomers to form a matrix polymer and coupling the matrix polymer with a thermally decomposable oligomer. To form the preferred ABA block copolymer, a thermally decomposable oligomer having only one reactive site is admixed with the difunctional monomer(s) to form the copolymer. Optionally, one or more of the monomers can be polyfunctional to crosslink the copolymer. Suitable crosslinking substituents include cyanato, malimide, nadimide and alkynyl e.g. propargyl. The thermally decomposable polymer will generally comprise 5 to 60 wt. % of the copolymer.

In forming the electronic component such as a chip or integrated circuit, the copolymer is generally dissolved in a common organic casting solvent such as tetrachloroethane, N-methylpyrrolidone or gamma-butyrolactone and deposited as a film on various substrates such as silicon, ceramic, glass, quartz, polymer with or without circuitry or the like by art known techniques such as spin or spray coating or doctor blading.

The second step of the process for forming the foamed polymer involves heating the copolymer to an elevated temperature to decompose the thermally decomposable polymer. The copolymer is heated to a temperature at or above the thermal decomposition temperature of the thermally decomposable polymer for a period of time from about 15 minutes to 3 hours. The thermally decomposable polymer decomposes to gas which diffuse out of the polymer leaving voids behind. The pore size of the foamed polymer will be generally the same size as the domains of the thermally decomposable polymer in the copolymer and the pore size can be varied by varying the molecular weight of the thermally decomposable polymer. The heating step also functions to drive off any casting solvent from the polymer and cure the polymer. Preferably, the copolymer is first heated to an elevated temperature below the decomposition temperature of the decomposable polymer to drive off the solvent and cure the copolymer. The copolymer is then heated to a temperature above the decomposition temperature of the decomposable polymer to form the foamed polymer.

The foamed polymer of the present invention can be used as a dielectric insulator in electronic components such as integrated chips, integrated circuit packaging structures (e.g. multichip modules), and circuit boards and the like. A preferred use of the foamed polymer would be in an integrated circuit packaging structure which provides signal and power current to a plurality of integrated circuit chips and comprises: a substrate having I/O pins for connection to a circuit board; and a plurality of alternating insulation and conductive layers positioned on the substrate. The structure, function and method for making multichip modules are generally known in the art as disclosed in U. S. Pat. Nos. 4,489,364; 4,508,981 and 4,811,082, the disclosures of which are incorporated herein by reference.

The following examples are detailed descriptions of methods of preparation of certain polymers of the present invention. The detailed preparations fall within the scope of, and serve to exemplify, the more generally described methods of preparation set forth above. The examples are presented for illustrative purposes only, and are not intended as a restriction on the scope of the invention. All temperatures are in degrees Celsius.

EXAMPLE 1

Preparation of Functionalized Thermally Decomposable Oligomer 10 gm of commercially available monofunctional hydroxyl terminated polypropylene oxide having Mn of 5000 was dissolved in 25 ml of 20% phosgene in toluene. The mixture was heated to 60° C. for 2 hours and then the phosgene and toluene were removed by a stream of nitrogen. The resulting chloroformate end-capped oligomer was dissolved in 50 ml of methylene chloride. To this mixture was added 0.43 g (0.0019 mole) of hydroxy benzil and 5 g of pyridine at 0° C. to form a benzil end cap polypropylene oxide having Mn of about 5000. The product was isolated by an aqueous workup and the methylene chloride was removed under reduced pressure to give 8.2 g of product.

EXAMPLE 2

Preparation of Copolymer 10.7135 g (50 mmole) of diaminobenzidine was slurried in 50 mL of m-cresol/xylene (1:1). A solution of 16.812 g (49.115) mmole) of bis (phenylglyoxalyl) benzene and 10.266 g (1.77 mmole) of the oligomer of Example 1 in 100 mL of m-cresol/xylene were added to the slurry dropwise with stirring. When the addition was complete, the mixture was stirred an additional 20 hours. The copolymer was isolated by precipitation in methanol followed by repeated rinses with methanol. The yield was 78%. Analysis of the copolymer by H NMR showed 20 wt % PO composition.

EXAMPLE 3

Preparation of the Foamed Poly(phenylquinoxaline)

The copolymer of Example 2 was dissolved in tetrachloroethane (TCE) at 9% solid concentration. A thin film (10µ) was formed on a 2.54 cm diameter Si wafer by spin coating at 2000 rpm. The solvent was then removed by heating the film in nitrogen to 150° C. at a rate of 5° C./min and maintaining the film at 150° C. for 2 hours. This does not cause decomposition of the polypropylene oxide. The film was then heated in air to 275° C. at a rate of 5° C./min. and maintained at 275° C. for 9 hours. The density of the polymer product was 1.16 gm/cm$^3$ and the dielectric constant was 2.38 (45° C.; 20 KHz) and 2.36 (100° C.; 20 KHz).

Poly (phenylquinoxaline) has a dielectric constant of 2.9 at 20 KHz and a density of 1.32. The foamed product polymer was analyzed by small angle x-ray scattering (SAXS) which showed the average pore size to be about 80 Å.

EXAMPLE 4

Forming Crosslinkable Copolymer

Following the procedure of Example 2 with bis (p-cyanatophenyl glyoxalyl) benzene as a Co reactant (40 mole %) the copolymer was formed.

EXAMPLE 5

Forming Crosslinked Foamed Polymer

The procedure of Example 3 was followed with the copolymer of Example 4 with an additional heating step after solvent removal by heating under nitrogen to 250° C. at a rate of 5° C./min. and maintaining at 250° C. for 1 hour to cause crosslinking of the polymer without decomposition of the polypropylene oxide. The foamed product polymer had a density of 1.19 gm/cm Although this invention has been described with respect to specific embodiments, the details thereof are not to be construed as limitations for it will be apparent that various embodiments, changes, and modifications may be resorted to without departing from the spirit and scope thereof, and it is understood that such equivalent embodiments are intended to be included within the scope of this invention.

We claim:

1. A process for forming a foamed polymer having a pore size less than about 1000 Å comprising the steps of:
   a. forming copolymer of a matrix polymer and a thermally decomposable polymer which thermally decomposes at a temperature below the decomposition temperature of the matrix polymer;
   b. heating said copolymer to a temperature at or above the decomposition temperature of the thermally decomposable polymer and below the glass transition temperature and the decomposition temperature of the matrix polymer to form said foam polymer.

2. The process of claim 1 wherein the pore size is less than about 400 Å.

3. The process of claim 1 wherein the decomposition temperature of the thermally decomposable polymer is greater than 150° C.

4. The process of claim 1 wherein said thermally decomposable polymer is poly (propylene oxide) or poly(methyl methacrylate).

5. The process of claim 1 wherein said matrix polymer is polyimide or poly (phenylquinoxaline).

* * * * *